United States Patent Office 3,359,239
Patented Dec. 19, 1967

3,359,239
POLYMERIZATION OF BIS-(α-HALOALKYL)AROMATIC COMPOUNDS IN THE PRESENCE OF A COUPLING AGENT; REACTION CONDUCTED IN ORGANIC SOLVENT/HYDROXYLIC SOLVENT MEDIUM
Karl Koch, Norwood, and John M. Hoyt and Charles E. Frank, Cincinnati, Ohio, assignors to National Distillers and Chemical Corporation, New York, N.Y., a corporation of Virginia
No Drawing. Filed Apr. 2, 1964, Ser. No. 356,943
21 Claims. (Cl. 260—47)

This invention relates to a new and improved polymerization process for the preparation of poly(arylenedialkylene) polymers and copolymers. More specifically, the invention pertains to the polymerization of bis-(α-haloalkyl)aromatic compounds to obtain polymeric and copolymeric products.

It has recently been found that bis-(α-haloalkyl)aromatic compounds can be polymerized, in solution, to the corresponding poly(arylenedialkylene) polymers at temperatures less than about 300° C. in the presence of a lower valent transition metal salt, e.g. chromous sulfate. U.S. patent application Ser. No. 357,279, entitled, "Polymerization Process." It has also recently been found that copolymeric products can be produced by reacting mixtures of one or more bis-(α-haloalkyl)aromatic compounds with certain olefinic compounds at these low temperatures with the same lower valent transition metal salts. U.S. patent application Ser. No. 357,303, entitled "Copolymerization Process." Both of these processes are preferably carried out in the presence of an inert atmosphere, e.g. nitrogen, to avoid oxidation of the lower valent transition metal salt. The processes also call for dissolving the lower valent transition metal salt in a hydroxylic solvent such as water, methanol, ethylene glycol and the like. It has been found important to employ a solvent for the bis-(α-haloalkyl)aromatic compound and for the olefinic compounds. When the latter solvents are employed, they were required to be miscible with the hydroxylic solvent used in conjunction with the lower valent transition metal salt. Typical examples of such miscible solvents are acetone, p-dioxane and the like. Although the above described processes have resulted in the preparation of outstanding polymers and copolymers, considerable research effort has been expended in order to attain increased yields and higher molecular weight products.

One object of the present invention is to provide new and improved polymerization and copolymerization processes involving the use of bis-(α-haloalkyl)aromatic compounds.

Another object of the present invention is to provide polymerization and copolymerization processes characterized by a marked increase in yields of desired products.

A further object of the present invention is to provide polymerization and copolymerization processes which result in products with relatively high molecular weights.

These and other objects of the present invention will become readily apparent from the ensuing description and illustrative embodiments.

In accordance with the present invention it has now been found that increased yields and higher molecular weight products can be achieved by reacting one or more bis-(α-haloalkyl)aromatic compounds or a mixture of a bis-(α-haloalkyl)aromatic compound and an olefinic compound in a two phase solvent system in the presence of a lower valent transition metal salt. Another feature of the present invention involves the use of minor amounts of an emulsifying agent with certain two phase solvent systems to obtain further increases in the yield and still higher molecular weights. More specifically, the processes of this invention comprise carrying out the reaction or reactions in certain two phase solvent systems consisting of an organic solvent such as decalin and a polar solvent, particularly a hydroxylic solvent such as ethylene glycol. The bis-(α-haloalkyl)aromatic compound and the olefinic compound, if employed, are soluble in the organic phase but insoluble in the hydroxylic solvent, while the lower valent transition metal salt or coupling agent is soluble only in the hydroxylic phase.

The hydroxylic solvents employed in the above described processes may be water; a lower alkanol such as methanol, ethanol, n-propanol, isopropanol and the like; or glycols such as ethylene glycols. Quite surprisingly, however, it has been found that the use of water as the hydroxylic solvent is relatively ineffectual for the present purposes. The lower alkanols proved to be much better as the hydroxylic phase, while the use of glycols such as ethylene glycol proved to be outstanding for increasing yields and molecular weights. Although ethylene glycol is preferred, other glycols such as glycerol, diethylene glycol and polyethylene glycols are also effective. As will be hereinafter demonstrated, the presence of a minor amount of an emulsifying or dispersing agent in conjunction with the ethylene glycol hydroxylic solvent was found helpful in achieving truly outstanding results in terms of yield and molecular weight.

One of the essential requirements of the organic solvent is that it should be substantially immiscible in the hydroxylic solvent and that a two phase reaction system result. The preferred organic solvent is decalin, since it is substantially immiscible with such hydroxylic solvents as water, methanol, and ethylene glycol. Although somewhat less preferred, other cyclic hydrocarbons such as cyclohexane may also be utilized. Other possible organic or hydrocarbon solvents include, for example, aromatic compounds such as benzene, toluene, xylene, o-dichlorobenzene and the like; and alkanes such as n-hexane, n-heptane, isooctane, n-decane, and the like.

Aromatic and aliphatic ketones, esters and ethers such as diisobutyl ketone, cyclohexane, dioctyl phthalate, diphenyl ether and the like are other possible candidates.

In general, the weight ratio of organic to hydroxylic solvent will range from about 0.1:1 to 100:1, and, preferably about 0.5:1 to 10:1.

As previously noted, a minor amount of a dispersing or emulsifying agent can be added to the reaction mixture in order to achieve superior results. The emulsifying agent is preferably of a non-ionic type such as a block copolymer of ethylene oxide and propylene oxide sold under the tradename Pluronic, e.g. Pluronic P-105, which is a 50/50 ethylene oxide/propylene oxide block copolymer of approximately 6,500 molecular weight. Other non-ionic emulsifying agents which may be employed include Triton X-100 (nonyl phenol-ethylene oxide adduct). Dytols (fatty alcohol-ethylene oxide adducts), and the like. Cationic and anionic surfactants can also be employed. In general, the amount of emulsifier employed will vary from about 0.05 to 10% by weight, preferably about 0.5 to 2.5% by weight, based on the weight of the hydroxylic solvent.

The preferred lower valent transition metals are divalent chromium, divalent vanadium and trivalent titanium; the use of divalent chromium salts is especially preferred. It was also found preferable to employ a transition metal salt with an anion of a strong acid, i.e., an acid which in $\frac{1}{10}$ N aqueous solution has a pH of less than about 2. Such anions include the sulfate, chloride, the phosphate and the like. The use of the chloride anion ($Cl^{-1}$) was found to be preferred for the purposes of this invention, and for purposes of illustration the invention will be described more particularly hereinafter in connection with the use of chromous chloride as the lower valent transition metal salt. Although the foregoing transition metals have been found to be especially useful in carrying out the polymerization process of this invention, other possible lower valent transition metals may be selected from the group consisting of hafnium, zirconium, columbium, tantalum, molybdenum, tungsten, manganese, iron, ruthenium, osmium, cobalt, rhodium, iridium, nickel, palladium, platinum, and copper.

In general, the concentration of the lower valent transition metal salt in the reaction mixture will be within the range of about 0.05 to 4 moles, and preferably about 0.1 to 1 mole per liter of reaction mixture.

As previously noted, the starting material for the polymerization process of this invention is a bis-($\alpha$-haloalkyl) aromatic compound. It has been found useful to employ bis-($\alpha$-haloalkyl) aromatic compounds wherein the aromatic substituent is an arene such as benzene, xylene, durene, etc.; a heterocyclic such as thiophene, furan, etc.; or a fused ring aromatic such as naphthalene, anthracene, Tetralin, indane, quinoline, isoquinoline, etc. The polymerization of bis($\alpha$-haloalkyl) arenes by the process of this invention is especially preferred. Although the $\alpha$-haloalkyl groups may be present at various positions on the aromatic substituent, it is preferred to have them located in the ortho and para positions to each other. The halogen of the $\alpha$-haloalkyl substituent is selected from the group consisting of chloride, bromide, iodide, fluoride, as well as mixtures thereof. The alkylene portion of the $\alpha$-haloalkyl substituents, on the other hand, may contain about 1 to 20 carbon atoms and may either be straight or branched chain. However, for most purposes the alkylene portion will contain from about 1 to 8 carbon atoms.

In general, the structural formula for the starting material will be $$X-CR_1R_2-Ar-CR_3R_4-X'$$

wherein:

X and X' are chlorine, bromine, fluorine, or iodine, and the X and X' may be the same or different;

$R_1$, $R_2$, $R_3$ and $R_4$ are fluorine, hydrogen, lower alkyl groups having from 1 to 3 carbon atoms, either straight or branched chain, aryl groups having from 6 to 10 carbon atoms and the R substituents may either be the same or different.

Ar is the aromatic substituent which is defined above, and the Ar substituent may be further substituted on the ring, and in various positions, with chlorine, bromine, iodine, cyano, nitro, carboxy, carboalkoxy or alkyl groups having from 1 to 20 carbon atoms, or alkoxy groups having from 1 to 20 carbon atoms. It will be understood that these alkyl and alkoxy groups may also be either straight or branched chain.

By utilizing such starting material the polymers prepared in accordance with the process of this invention will contain the following recurring units.

$$-CR_1R_2-Ar-CR_3R_4-$$

with the various substituents as above defined.

For the purposes of a more complete description, the following is a list of bis-haloalkyl)aromatic compounds which can be effectively employed in the process of this invention:

$\alpha,\alpha'$-dichloro-p-xylene
$\alpha,\alpha'$-dibromo-o-xylene
$\alpha,\alpha'$-difluoro-p-xylene
1,4-bis-($\alpha$-chloroisopropyl)benzene
2,5-bis-(chloromethyl)-p-xylene
$\alpha,\alpha'$-dichloro-2-nitro-p-xylene
$\alpha,\alpha'$-dichloro-2,5-dicyano-p-xylene
$\alpha,\alpha'$-dichloro-4-carbomethoxy-p-xylene
$\alpha,\alpha'$-dichloro-$\alpha,\alpha'$-diphenyl-p-xylene
2,5-bis-(chloromethyl)-1,4-dimethoxybenzene
4,5-bis-(chloromethyl)-1,2-dimethoxybenzene
4,5-bis-(chloromethyl)-o-xylene
$\alpha,\alpha'$,2,3,5,6-hexachloro-p-xylene
1,4-bis-(difluorochloromethyl)-2,3,5,6-tetrafluorobenzene
1,2-bis-(difluorochloromethyl)-3,4,5,6-tetrachlorobenzene
1,4-bis-(chloromethyl)naphthalene
5,8-bis-(chloromethyl)Tetralin
5,6-bis-(chloromethyl)indane
bis-(chloromethyl)durene
1,4-dibromo-1,2,3,4-tetrahydronaphthalene
1,4-dichloro-1,4-dihydronaphthalene
1,3-dichloroindane
2,5-bis-(chloromethyl)thiophene
2,5-bis-(chloromethyl)furan
5,8-bis(chloromethyl)quinoline
5,8-bis-(chloromethyl)isoquinoline
5,6-bis-(chloromethyl)quinoline
6,7-bis-(chloromethyl)-4-chloroquinoline
9,10-bis-(chloromethyl)anthracene
9,10-bis-(chloromethyl)-1-methylanthracene
9,10-bis-(chloromethyl)phenanthrene The olefinic compounds which may be employed in conjunction with the bis-($\alpha$-haloalkyl)aromatic compounds to prepare various copolymers will have the following structural formula $$R_5CH=CR_6R_7$$

wherein:

$R_5$ is selected from the group consisting of hydrogen, cyano or aryl radicals having from 6 to 10 carbon atoms;

$R_6$ is selected from the group consisting of hydrogen, a lower alkyl group having from 1 to 6 carbon atoms, and a COOR radical wherein R is a lower alkyl group having from 1 to 12 carbon atoms;

$R_7$ is selected from the group consisting of hydrogen, a CN radical, a $NO_2$ radical, a COOH radical, a lower alkyl group having from 1 to 6 carbon atoms, a $$CH_2COOR$$

radical wherein R is a lower alkyl group having from 1 to 12 carbon atoms, a $CONH_2$ radical, a CONHR' or a $CONR'_2$ radical in which R' is a lower alkyl group having 1 to 6 carbon atoms, or an aryl group having 6 to 10 carbon atoms. Illustrative vinyl comonomers include styrene
p-chlorostyrene
methyl acrylate
methyl methacrylate
acrylamide
N,N-dimethyl acrylamide
acrylonitrile
diethyl itaconate
ethyl cinnamate
cinnamonitrile
fumaronitrile
$\omega$-nitrostyrene When a comonomer is employed in preparing copolymeric products, the mole ratio of the bis-($\alpha$-haloalkyl) aromatic compound to the olefinic comonomer will generally range from about 100:1 to 1:100, and preferably about 100:5 to 5:100.

The polymerization and copolymerization processes of this invention are advantageously carried out within a temperature range of about $-30°$ to 300° C., preferably about 0° to 100° C. The pressure under which the reaction may be carried out can vary from about 1 to 1000 p.s.i.a., and it is preferably autogenous. For most purposes it is preferred to carry out the polymerization and copolymerization reactions in an inert atmosphere to prevent oxidation of the lower valent transition metal salt. Illustrative inert gases include nitrogen, argon, carbon dioxide, methane, helium and mixtures thereof, and the like. Although the reactions will proceed without agitation or stirring, some degree of agitation during the polymerization or copolymerization reaction has been found helpful. The time period for carrying out the reactions of this invention may vary over a wide range depending in part on other operation conditions employed. In general, however, the time period may range from about 1 minute up to about 48 hours with the preferred time being about 2 to 4 hours. The processes may also be carried in a continuous or semicontinuous basis. For economic reasons, the lower valent transition metal salt, which becomes oxidized during the course of the reaction, is recovered and reduced to its original lower valent state and recycled.

In accordance with one method of carrying out the process of this invention, a bis-(α-haloalkyl)aromatic compound is reacted with a transition metal salt of lower valence, for example, chromous chloride, in a two-phase solvent system consisting, for example, of a hydrocarbon solvent such as Decalin and a hydroxylic solvent such as ethylene glycol. The reaction is conducted in the presence of an emulsifying or dispersing agent, preferably a block copolymer of ethylene oxide and propylene oxide.

The solution of chromous chloride in ethylene glycol can be prepared by reducing anhydrous chromic chloride with metallic zinc in ethylene glycol. If the presence of zinc in the resulting solution is to be avoided, metallic chromium may be used in place of the zinc. Alternatively, the chromous chloride may be prepared by reducing anhydrous chromic chloride with hydrogen at about 350° to 800° C., in a process known to the art, and then dissolved in the ethylene glycol. Continuous in situ regeneration of the lower valent transition metal salt is possible by maintaining an excess of reducing metal, e.g., zinc or chromium, in contact with the transition metal solution during the polymerization.

The bis-(α-haloalkyl)aromatic compound, for example, 2,5 - bis - (chloromethyl) - 1,4 - dimethoxybenzene, together with the emulsifier and the organic solvent, for example, Decalin, are contacted with the chromous chloride solution in ethylene glycol under an inert atmosphere, (e.g. nitrogen), and with agitation, at temperatures of 50° to 80° C. The reaction is carried out for a period of 2 to 4 hours and then the reaction mixture is diluted with water or aqueous sodium chloride solution, if necessary, to achieve the destruction of emulsions formed. The polymer is collected from both phases, washed with water to remove metal salts, and washed or extracted with acetone to remove unreacted bis - (α - haloalkyl)aromatic compound, low polymers and by-products, and dried.

The invention will be more fully understood by reference to the following illustrative embodiments.

EXAMPLE I

*Preparation of poly(2,5-dimethoxy-p-xylylene) from 2,5-bis - (chloromethyl) - 1,4 - dimethoxybenzene using a $CrCl_2$ in ethylene glycol coupling agent without added emulsifier.*

PART A.—PREPARATION OF A SOLUTION OF $CrCl_2$ IN ETHYLENE GLYCOL

The solution of $CrCl_2$ in ethylene glycol was prepared according to the general directions for preparing aqueous $CrSO_4$ solutions by zinc-reduction of the chromic compound, as described by C. E. Castro, J. Am. Chem. Soc., 83, 3262(1961). For example, 83 g. (0.52 mole) of anhydrous $CrCl_3$ and 15 g. (0.23 g-atom) of 20-mesh metallic zinc were stirred overnight at room temperature under nitrogen in 270 ml. of ethylene glycol, to yield a solution, which after filtration to remove unreacted Zn, contained 0.90 mole per liter (55% theoretical) of $CrCl_2$. The $CrCl_2$ concentration was determined by reacting measured samples with excess 0.25 M $FeCl_3$ solution under nitrogen and then titrating to the green ferric-phenanthroline end point with standard ceric ammonium sulfate solution.

Solutions in other hydroxylic solvents such as methanol can be prepared in this way and, if it is desired to eliminate the presence of zinc ions in the solution, the reduction of chromic chloride may be effected by the use of metallic chromium or hydrogen.

PART B.—PREPARATION OF POLY(2,5-DIMETHOXY-p-XYLYLENE) BY COUPLING 2,5-BIS-(CHLOROMETHYL)-1,4-DIMETHOXYBENZENE WITH A SOLUTION OF $CrCl_2$ IN ETHYLENE GLYCOL WITHOUT EMULSIFIER ADDED

The coupling-polymerization reaction was carried out in a home blender or an Osterizer. Teflon gaskets were used.

Into a 1-quart Mason jar, well-flushed with nitrogen, was introduced 53.7 ml. of a 0.764 N ethylene glycol solution of chromous chloride (41 millimoles), 2.93 g. (12.5 millimoles) of 2,5-bis - (chloromethyl) - 1,4-dimethoxybenzene (prepared according to the method of J. H. Wood, M. A. Perry and C. C. Tung, J. Am. Chem. Soc., 72, 2989(1950), M.P. 165.5–167° C. corr.) and 50 ml. of Decalin. Agitation of the mixture was started immediately and was continued for 2 hours. The temperature in the reactor jar under these conditions ranged from about 55° to 70° C. At the end of the 2 hour period the contents of the jar were diluted with water and transferred to a separatory funnel. Separation of the phases was aided by adding toluene. The aqueous phase was separated and discarded. The organic phase was washed with NaCl solution to further promote breaking of the emulsion present and then finally washed with water. Solid polymer present was collected, washed well with water, washed finally with acetone, and dried in vacuum. A total of 0.92 g. of poly(2,5-dimethoxy-p-xylylene) was obtained as a white powder. (44.7% yield.) Poly(2,5-dimethoxy-p-xylylene) has also been prepared by J. H. Golden, J. Chem. Soc., 1604(1961) by coupling 2,5-bis - (chloromethyl) - 1,4 - dimethoxybenzene with phenyllithium; Golden reported a softening point of 238° C. The polymer of this example softened at 236–239° C. and dissolved completely in 8 minutes in benzyl benzoate at 222° C. (boiling methyl salicylate bath) and had an inherent viscosity of 2.1 (0.42 g. per 100 ml. solvent), determined immediately after going into solution, using the method and a viscometer similar to that described for poly(p-xylylene) polymers by T. E. Young (U.S. Patent 2,999,820) and J. R. Schaefgen (J. Polymer Sci., 49, 133(1959)). The concentration at 222° C. was calculated from density data reported for benzyl benzoate at room temperature and 305° C. by the above authors, assuming linearity between these temperatures.

EXAMPLE II

*Preparation of poly (2,5-dimethoxy-p-xylylene) by coupling 2,5-bis - (chloromethyl) - 1,4-dimethoxybenzene with CrCl2 in ethylene glycol with added emulsifier*

In the same manner as described in Example I, a mixture of 46 ml. of a 0.891 N ethylene glycol solution of $CrCl_2$ (41 millimoles), 2.93 g. (12.5 millimoles) of 2,5-bis-(chloromethyl) - 1,4 - dimethoxybenzene, 50 ml. Decalin and 0.45 g. of Pluronic P-105 (50/50 ethylene oxide/propylene oxide block copolymer, M.W. approximately 6,500) was agitated for 2 hours under nitrogen. A total of 1.69 g. (82%) of poly(2,5-dimethoxy-p-xylylene) was isolated as white solid. This polymer softened at 240–242° C.

The polymer dissolved completely in benzyl benzoaote within 19 minutes at 222° C. and had an inherent viscosity of 2.9 (0.42 g./100 ml. solvent), determined as described in Example I.

Comparison of the results described in Examples I and II reveals that the presence of the emulsifier favors higher yields and high molecular weights in the poly(2,5-dimethoxy-p-xylylene) obtained under otherwise similar conditions.

EXAMPLE III

A series of similar runs, using substantially the same conditions described in Example I, were carried out in which the nature of the CrCl₂ solvent, the use of an emulsifier, the concentration of the emulsifier, and time of polymerization were variables. Decalin was employed as the organic phase of the two phase systems in all runs. The results of the runs are tabulated in the table, the subscripts having the following meanings:

(1) Pluronic P-105 is a 50/50 ethylene oxide-propylene oxide block copolymer of approximately 6,500 molecular weight.

(2) CrCl₂ solutions were prepared by Zn-reduction of anhydrous CrCl₃ in the stated solvent.

(3) Inherent viscosity determined as in Example I, in benzyl benzoate. Concentration at 222° C. was 0.42 g. polymer per 100 ml. of solvent; at 305° C. it was 0.39 g. polymer per 100 ml. of solvent.

(4) 60 ml. of 0.695 N CrCl₂ in methanol was concentrated by distillation under N₂ to 10–15 ml. To this was added 50 ml. ethylene glycol.

(5) Reaction time is ½ hour.

(6) Reaction time is 6.5 hours.

soluble in benzyl benzoate at 222° C. within 4 minutes and had an inherent viscosity of 1.13, determined as described in Example I.

The above data show that the use of a polyethylene oxide polymer as a thickening agent does not provide as high a yield of polymeric product nor as high a molecular weight product as does the use of a Pluronic type emulsifier.

While particular embodiments of this invention are shown above, it will be understood that the invention is obviously subject to variations and modifications without departing from its broader aspects.

What is claimed is:

1. In a polymerization process which comprises reacting at least one bis-($\alpha$-haloalkyl)aromatic compound, capable of polymerization, having the formula $$X—CR_1R_2ArCR_3R_4—X'$$

wherein:

X and X' are selected from the group consisting of

TABLE.—COUPLING OF 2,5-BIS-(CHLOROMETHYL)-1,4-DIMETHOXYBENZENE (M) GLYLENE WITH CrCl₂ IN TWO PHASE SOLVENT SYSTEMS

[Amount of (M): 2.93 g. (12.5 mmoles). Reaction Time: 2 Hours. Emulsifier: Pluronic P-105 (1)]

| Run No. | CrCl₂ | | | | Second Organic Phase | | Emulsifier, g. | Final temp., °C. | Appearance | Polymer Properties | | | |
|---|---|---|---|---|---|---|---|---|---|---|---|---|---|
| | Solvent (2) | N | Amount | | Name | Ml. | | | | Yield | | Viscosity | |
| | | | Ml. | CrCl₂, mmoles | | | | | | G. | Percent | Eta$_{inh}$ (3) | Temp. det'd, °C. |
| 1 | H₂O | 1.02 | 50 | 51.2 | Decalin | 40 | None | 82 | Green solid | 0.2 | 10 | | |
| 2 | H₂O | 0.943 | 50 | 48.1 | Decalin n-propanol | 40 / 50 | do | 85 | White solid | 0.3 | 14.6 | | |
| 3 | CH₃OH | 0.888 | 50 | 44.4 | Decalin | 50 | do | 70 | do | 0.9 | 43.7 | 0.48 | 222 |
| 4 | HOCH₂CH₂OH | 0.764 | 54 | 41.0 | do | 50 | do | 55 | do | 0.92 | 44.7 | 2.1 | 222 |
| 5 | H₂O | 0.926 | 50 | 46 | do | 50 | 0.45 | 85 | do | 0.40 | 19.4 | 0.32 | 222 |
| 6 | CH₃OH | 0.820 | 50 | 41 | do | 50 | 0.45 | 67 | do | 1.05 | 51.0 | 1.93 | 305 |
| 7 | CH₃OH | 0.75 | 55 | 41 | do | 50 | 0.45 | 60 | do | 1.18 | 57.3 | 2.2 | 305 |
| | | | | | HOCH₂CH₂OH | 16 | | | | | | | |
| 8 | HOCH₂CH₂OH (4) | | 50 | 41 | Decalin | 50 | 0.45 | 65 | Lt. blue solid | 1.58 | 76.8 | 1.8 | 305 |
| 9 | HOCH₂CH₂OH | 0.891 | 46 | 41 | do | 50 | 0.45 | 65 | White solid | 1.69 | 82 | 2.9 | 222 |
| 10 | CH₃OH | 0.794 | 52 | 41 | do | 50 | 0.23 | 65 | do | 1.00 | 48.5 | 0.58 | 305 |
| 11 | CH₃OH | 0.973 | 43 | 41 | do | 50 | 0.90 | 55 | do | 0.63 | 30.6 | 0.17 | 305 |
| 12 | CH₃OH (5) | 0.99 | 41 | 41 | do | 65 | 0.45 | 65 | do | 0.74 | 35 | 0.26 | 305 |
| 13 | CH₃OH (6) | 0.75 | 55 | 41 | do | 58 | 0.45 | 58 | do | 0.98 | 48 | 1.60 | 305 |

It will be observed that water-decalin solvent system gave relatively poor results (Runs No. 1, 2 and 5) the yield ranging from 10–20% with the inherent viscosity not exceeding 0.32, irrespective of whether an emulsifier was used. Use of methanol or ethylene glycol as a solvent for CrCl₂ affords yields of about 45% even without an emulsifier, with much higher inherent viscosity being observed in the case of ethylene glycol (Runs No. 3 and 4). When an emulsifier is used, yields of the order of 77–82% are observed with the glycol solutions (Runs No. 8 and 9), and the inherent viscosities approach 3; when methanol is the CrCl₂ solvent, the yield scarcely rises above 50% although inherent viscosities are high. The methanol decalin system appears to be sensitive to the amount of emulsifier present (Runs No. 6, 10 and 11) and prolonging the reaction time beyond 2 hours did not improve the yield. (Runs No. 6, 12 and 13.)

EXAMPLE IV

*Preparation of poly(2,5-dimethoxy-p-xylylene) using CrCl₂ in an ethylene glycol-decalin system with added polyethylene oxide thickening agent*

In an apparatus and in a manner similar to that described in Example I, from 61 ml. of a 0.799 N solution of CrCl₂ in ethylene glycol (41 millimole CrCl₂), 2.92 g. (12.5 millimoles) of 2,5-bis-(chloromethyl)-1,4-dimethoxybenzene, 0.45 g. Polyox WSR–301 (a polyethylene oxide polymer) and 50 ml. of decalin there was obtained 1.35 g. (65.6% yield) of poly(2,5-dimethoxy-p-xylylene) as a white powder, M.P. 233–235° C. This polymer was chlorine, bromine, iodine, fluorine and mixtures thereof;

$R_1$, $R_2$, $R_3$ and $R_4$ are selected from the group consisting of hydrogen, fluorine, lower alkyl group having from 1 to 3 carbon atoms, aryl group having 6 to 10 carbon atoms, and mixtures thereof;

Ar is an aromatic substituent selected from the group consisting of arenes, aromatic heterocyclics, and fused ring aromatics, with a lower valent transition metal salt dissolved in a hydroxylic solvent at a temperature within the range of about −30° to 300° C.; the improvement which comprises conducting said polymerization in a two phase solvent reaction medium wherein said bis-(alpha-haloalkyl) aromatic compound is dissolved in an organic solvent which is substantially immiscible in said hydroxylic solvent.

2. The process of claim 1 wherein said hydroxylic solvent is selected from the group consisting of ethylene glycol and a lower alkanol having from 1 to 3 carbon atoms.

3. The process of claim 1 wherein said organic solvent is selected from the group consisting of decalin, cyclohexane, xylene, benzene, toluene, o-dichlorobenzene, and mixtures thereof.

4. The process of claim 1 wherein said hydroxylic solvent is ethylene glycol and said organic solvent is decalin.

5. The process of claim 1 wherein said reaction is carried out under a nitrogen atmosphere.

6. The process of claim 1 wherein said bis-($\alpha$-haloalkyl)aromatic compound is a bis-($\alpha$-haloalkyl)arene.

7. The process of claim 6 wherein said arene is 2,5-bis-(chloromethyl)-1,4-dimethoxybenzene.

8. The process of claim 1 wherein said transition metal salt has a cation selected from the group consisting of divalent chromium, divalent vanadium and trivalent titanium.

9. The process of claim 8 where said transition metal salt is chromous chloride.

10. The process of claim 1 wherein said reaction is carried out in the presence of a minor amount of a non-ionic emulsifier.

11. The process of claim 10 wherein said non-ionic emulsifier is a block copolymer of ethylene oxide and propylene oxide.

12. In a polymerization process which comprises reacting at least one bis-($\alpha$-haloalkyl)arene, capable of polymerization, having the formula $$X\text{---}CR_1R_2ArCR_3R_4\text{---}X'$$

wherein:
X and X' are selected from the group consisting of chlorine, bromine, iodine, fluorine and mixtures thereof.
$R_1$, $R_2$, $R_3$ and $R_4$ are selected from the group consisting of hydrogen, fluorine, lower alkyl group having from 1 to 3 carbon atoms, aryl group having 6 to 10 carbon atoms and mixtures thereof;
Ar is a divalent arene radical; with an olefinic compound having the formula $$R_5CH=CR_6R_7$$

wherein:
$R_5$ is selected from the group consisting of hydrogen, a cyano radical, and aryl groups having from 6 to 10 carbon atoms;
$R_6$ is selected from the group consisting of hydrogen, a lower alkyl group having from 1 to 6 carbon atoms, and a COOR radical wherein R is a lower alkyl group having from 1 to 12 carbon atoms;
$R_7$ is selected from the group consisting of hydrogen, a CN radical, a COOH radical, a lower alkyl group having from 1 to 6 carbon atoms, $CH_2COOR$ and COOR radicals wherein R is a lower alkyl group having from 1 to 12 carbon atoms, a $CONH_2$ radical, a CONHR' or $CONHR'_2$ radical wherein R' is a lower alkyl group having from 1 to 6 carbon atoms, and an aryl group having 6 to 10 carbon atoms, in the presence of a lower valent chromium salt dissolved in a hydroxylic solvent at a temperature within the range of about 0° to 100° C. under an inert atmosphere; the improvement which comprises conducting said polymerization in a two phase solvent reaction medium wherein said bis-(alpha-haloalkyl) arene and said olefinic compound are dissolved in an organic solvent which is substantially immiscible is said hydroxylic solvent.

13. The process of claim 12 wherein said bis-($\alpha$-haloalkyl)arene compound is 2,5-bis-(chloromethyl)-1,4-dimethoxybenzene.

14. The process of claim 12 wherein said olefinic compound is methyl methacrylate.

15. The process of claim 12 wherein said chromium salt is chromous chloride.

16. The process of claim 12 wherein said inert atmosphere is nitrogen.

17. The process of claim 12 wherein said hydroxylic solvent is selected from the group consisting of ethylene glycol and a lower alkanol having from 1 to 3 carbon atoms.

18. The process of claim 12 wherein said organic solvent is selected from the group consisting of decalin, cyclohexane, xylene, benzene, toluene, o-dichlorobenzene, and mixtures thereof.

19. The process of claim 12 wherein said hydroxylic solvent is ethylene glycol and said organic solvent is decalin.

20. The process of claim 12 wherein said reaction is carried out in the presence of a minor amount of a non-ionic emulsifier.

21. The process of claim 20 wherein said emulsifier is a block copolymer of ethylene oxide and propylene oxide.

References Cited
UNITED STATES PATENTS

| | | | |
|---|---|---|---|
| 2,870,098 | 1/1959 | Martin et al. | 260—2 |
| 2,873,299 | 2/1959 | Mikeska | 260—2 |
| 2,914,489 | 11/1959 | Hall | 260—2 |

FOREIGN PATENTS

| | | |
|---|---|---|
| 526,998 | 6/1956 | Canada. |
| 1,016,024 | 9/1957 | Germany. |

JOSEPH L. SCHOFER, *Primary Examiner.*

HARRY WONG, Jr., *Assistant Examiner.*